US006583521B1

(12) United States Patent
Lagod et al.

(10) Patent No.: US 6,583,521 B1
(45) Date of Patent: Jun. 24, 2003

(54) ENERGY MANAGEMENT SYSTEM WHICH INCLUDES ON-SITE ENERGY SUPPLY

(76) Inventors: Martin Lagod, 267 Catalpa Dr., Atherton, CA (US) 94027; Robert G. Aldrich, 3 Alverno Ct., Redwood City, CA (US) 94061; Alexander Guettel, 345 W. 13th, Apt. 5H (Hudson), New York, NY (US) 10014

( * ) Notice: Subject to any disclaimer, the term of this patent is extended or adjusted under 35 U.S.C. 154(b) by 0 days.

(21) Appl. No.: 09/531,167

(22) Filed: Mar. 21, 2000

(51) Int. Cl.$^7$ .............................. H02J 1/00; H02J 1/10
(52) U.S. Cl. ........................................... 307/70; 307/29
(58) Field of Search .............................. 307/18, 23, 29, 307/38, 64, 65, 70, 71, 72, 80, 85, 86

(56) References Cited

U.S. PATENT DOCUMENTS

| | | | | |
|---|---|---|---|---|
| 4,090,088 A | * | 5/1978 | McMahon et al. | 307/34 |
| 4,262,214 A | * | 4/1981 | Patel | 307/51 |
| 5,797,127 A | | 8/1998 | Walker et al. | |
| 5,880,536 A | | 3/1999 | Mardirossian et al. | |
| 5,897,620 A | | 4/1999 | Walker et al. | |
| 6,034,443 A | * | 3/2000 | Oliemuller et al. | 307/70 |
| 6,169,340 B1 | * | 1/2001 | Jones | 307/64 |

FOREIGN PATENT DOCUMENTS

| | | |
|---|---|---|
| WO | 97 35374 A | 9/1997 |
| WO | 99 60687 A | 11/1999 |
| WO | 00 41288 A | 7/2000 |

OTHER PUBLICATIONS

Davis, Murray W., "*Microturbines—An Economic and Reliability Evaluation for Commercial, Residential, and Remote Load Applications*", No. PE–480–PWRS–0–10–1988, IEEE 1998, 7 pgs.

* cited by examiner

Primary Examiner—Matthew Nguyen
(74) Attorney, Agent, or Firm—Burns, Doane, Swecker & Mathis, L.L.P.

(57) ABSTRACT

An energy management system includes one or more electric power generators located at or near a consumer's premises, to provide power which is dedicated to the needs of that consumer. The power provided by the on-site generators complements that which is delivered via a centralized power grid network. In the event that the power grid is disabled, or is otherwise unable to provide adequate power to the consumer, the on-site generators are switched to provide power to critical equipment. In one embodiment, a computer-driven control facility selectively actuates the on-site generator to intelligently arbitrage between the locally generated power and that which is provided via the grid network, based on a variety of factors. The instantaneous cost of power supplied via the grid network is compared against stored costs of operating the on-site generators, such as the price of fuel required to run the generators, maintenance expenses, other types of service and installation expenses, and finance charges. When these costs are less than the charges for the power provided by the grid network, the central control system actuates the on-site generators, to partially or totally replace power delivered via the grid. Other factors are also employed in the decision whether to activate the on-site generators, such as data relating to weather conditions and peak usage periods. Historical data regarding the consumer's power usage is employed to predict times when the usage requirements are likely to be high, and thereby actuate the generators to supplement or replace the power provided from the grid.

48 Claims, 3 Drawing Sheets

ENERGY MANAGEMENT SYSTEM WHICH INCLUDES ON-SITE ENERGY SUPPLY

FIELD OF THE INVENTION

The present invention is directed to the delivery of energy to consumers, and more particularly to a system which integrates on-site energy generation capabilities with conventional centralized power distribution networks.

BACKGROUND OF THE INVENTION

Conventionally, the delivery of various types of energy to consumers, such as industries, commercial entities, and residential customers, has been carried out by regulated agencies. For example, in the United States the distribution of electrical power has been serviced by a few thousand regulated monopoly franchises. In many cases, all of the energy customers within a given geographic area rely upon a single electrical power distribution company for their entire supply.

From the standpoint of the customer, certain inconveniences are associated with the concentration of power distribution in a single entity. Foremost among these is the reliability with which the power is delivered. The ability of a power company to deliver adequate amounts of energy to all of its customers is dependent upon a variety of factors. Among these factors, the one which has perhaps the most significant impact is the weather. Catastrophic weather conditions, such as hurricanes, tornadoes, ice storms, and the like, can severely disrupt the power distribution facilities, causing customers to lose access to power for hours, days or even weeks at a time. Increasingly volatile weather patterns have exacerbated this problem. Power reliability is also adversely impacted by construction and motor vehicle accidents that disrupt power lines.

Another factor, which is sometimes related to the weather, is usage. For instance, during hot summer months, the demands of air conditioning and refrigeration systems may surpass the capacity of the power distribution system during peak periods. As a result, the amount of power delivered to each customer is reduced, resulting in so-called "brown-out" conditions. Under these conditions, certain types of equipment may not operate properly, or may fail to operate at all, due to voltage levels that are below minimum specifications, and/or fluctuations that are created by an electrical utility in balancing of loads. This problem becomes more acute with the increasing use of various types of low-power digital electronic equipment, such as computers, which are much more sensitive to variations in voltage levels. Frequent fluctuations in power quality such as dips, surges, sags and spikes are a significant source of annoyance and disruption to consumers. These and other power quality inconsistencies are driven mainly by the factors described above: weather, accidents and grid congestion.

Another source of inconvenience associated with centralized power distribution is the unpredictability of costs. The cost to traditional utilities of providing power to consumers changes with the season and time of day, in large part due to scarcity of distribution capacity. In an effort to persuade consumers to reduce their usage during peak periods, energy companies may impose higher rates on power consumption based on time of day or power grid usage levels. As a result, consumer's bills are significantly increased if they must use power during these times, making it more difficult to predict monthly or yearly energy costs.

Finally, centralized power generation has deleterious environmental impacts. Key environmental concerns associated with power plants are air emissions, water use and aesthetic objections. The distribution and transmission grid also poses both aesthetic and potential environmental hazards. Government regulations to make power generation more environmentally friendly, as well as on plant and grid construction, have imposed new cost pressures on power plants, thereby increasing the price of the energy to the consumer.

In an effort to alleviate some of these inconveniences, particularly those associated with the unreliability of power delivery, consumers may install a local back-up system. Typically, this type of system may comprise one or more electric power generators that operate on fuels such as natural or liquid gas. These generators are designed to replace, or supplement, the power delivered via a centralized electric power grid during those times when the centralized power is not available, or is insufficient to meet the consumer's needs.

While the use of local generators provides some relief when centralized power is not available, they do not offer a totally satisfactory solution. For instance, the purchase of the generators, and all related equipment, can represent a significant up-front investment for the consumer, which may take years to pay for itself. Furthermore, the consumer is required to perform regular maintenance on the generation equipment, even though it may not be used for a considerable period of time. In addition, the quality of the power delivered by local generators may be insufficient to meet the consumer's needs, and are therefore limited to use in emergency conditions.

It is an objective of the present invention, therefore, to provide on-site power generation capabilities to consumers that can be integrated with the power delivered via a computer-driven centralized network, to thereby ensure the reliable availability of power at a predictable rate, while avoiding the inconveniences typically associated with consumer-owned generation equipment.

SUMMARY OF THE INVENTION

Pursuant to the foregoing objectives, the present invention comprises a method and system in which one or more electric power generators are located at or near a consumer's premises, to provide power which is dedicated to the needs of that consumer. In one embodiment of the invention, the power provided by the on-site generators complements that which is delivered via a centralized power grid network. For example, the on-site generators can be normally configured to provide power to critical components of the consumer, such as refrigeration equipment, and the power requirements of other equipment can be supplied by the power grid. In the event that the power grid is disabled, or is otherwise unable to provide adequate power to the consumer, the on-site generators can be switched to provide power to the other equipment in lieu of, or in addition to, the principally supported components. If necessary, the power that is supplied to the critical equipment, such as refrigeration, can be cycled on and off, to balance the load on the generators.

In a further embodiment of the invention, a central control facility selectively actuates the on-site generator(s) to intelligently arbitrage between the locally generated power and that which is provided via the grid network, based on a variety of factors. For example, the instantaneous cost of power supplied via the grid network is provided to a processor in the control facility, where it is compared against stored costs of operating the on-site generators. These costs might include the price of fuel required to run the generators, maintenance expenses, other types of service and installation expenses, and finance charges, if applicable. When all of these costs are less than that power company's charges for the power provided by the grid network, the central control system can selectively actuate the on-site generators, to partially or totally replace power delivered via the grid. Since the costs for operating the generators are known in advance, to a large degree, it becomes possible to guarantee the consumer a maximum price for its power needs.

In addition to price-based considerations, other factors can also be employed in the decision whether to activate the on-site generators. For example, data relating to weather conditions and peak usage periods can be employed to actuate the generators at times when the delivery of power via the grid is likely to be interrupted or unreliable. In some cases, the utility may be willing to buy back some of the power which it would otherwise provide to the consumer during peak usage periods, which can influence the decision to employ on-site generation.

As another factor, historical data regarding the consumer's power usage can be employed to predict times when the usage requirements are likely to be high, and thereby actuate the generators to supplement or replace the power provided from the grid.

The features of the invention, and the advantages provided thereby, are explained in greater detail hereinafter with reference to exemplary embodiments of the invention illustrated in the accompanying drawings.

DETAILED DESCRIPTION

Generally speaking, the present invention is directed to an arrangement in which power generation equipment is located at the site of a consumer, and provides electrical power that supplements and/or replaces the power delivered by a centralized power distribution network, such as those affiliated with regional power utilities. To facilitate an understanding of the invention, it will be described hereinafter with reference to its use in connection with the power requirements of commercial enterprises and light industry. It will be appreciated, however, that the practical implementations of the invention are not limited to these particular applications. Rather, in view of the reliability and economic advantages offered by the invention, it can be used by all types of electrical power consumers.

Figure 1A:
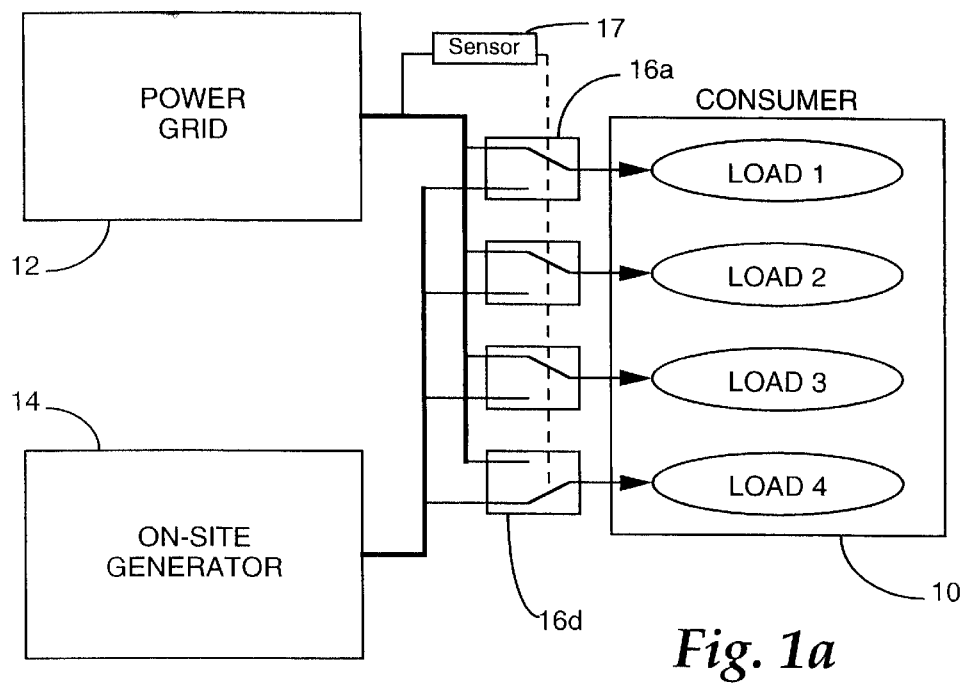
FIG. 1a is a general block diagram of a first embodiment of a power supply arrangement in accordance with the present invention under normal supply conditions.

A simplified overview of one implementation of the invention is illustrated in the block diagram of FIG. 1a. An electrical power consumer 10 may have a number of different types of electrically powered equipment, which are represented as various loads. For example, if the consumer is a grocery store, some of these loads might include computers, lighting, ventilation and refrigeration equipment. These different loads may have different levels of priority, as far as their power requirements are concerned. For instance, loss of power to the ventilation equipment may pose an inconvenience, but would not require the store to immediately close. The computers and lighting may be required for operation, and so the store may have to close temporarily if they lose power, but is otherwise unaffected. In contrast, the refrigeration equipment is highly dependent upon a supply of reliable power. Interruption of power to this equipment for an appreciable length of time could result in significant losses to the business because of the highly perishable nature of the inventory.

In the example depicted in FIG. 1, therefore, the power requirements for the less critical loads, such as the computers, lighting and ventilation (depicted as Loads 1, 2 and 3 in the figure), are normally supplied via a power grid 12 through which the consumer obtains its electrical energy from a local utility, an energy cooperative, or the like. In contrast, the more critical energy requirements of the refrigeration equipment, Load 4, are supplied by an on-site generator 14. Thus, even if the electrical power from the grid should diminish and/or be interrupted, due to weather, excessive loading, etc., the critical load will remain operational.

Figure 1B:
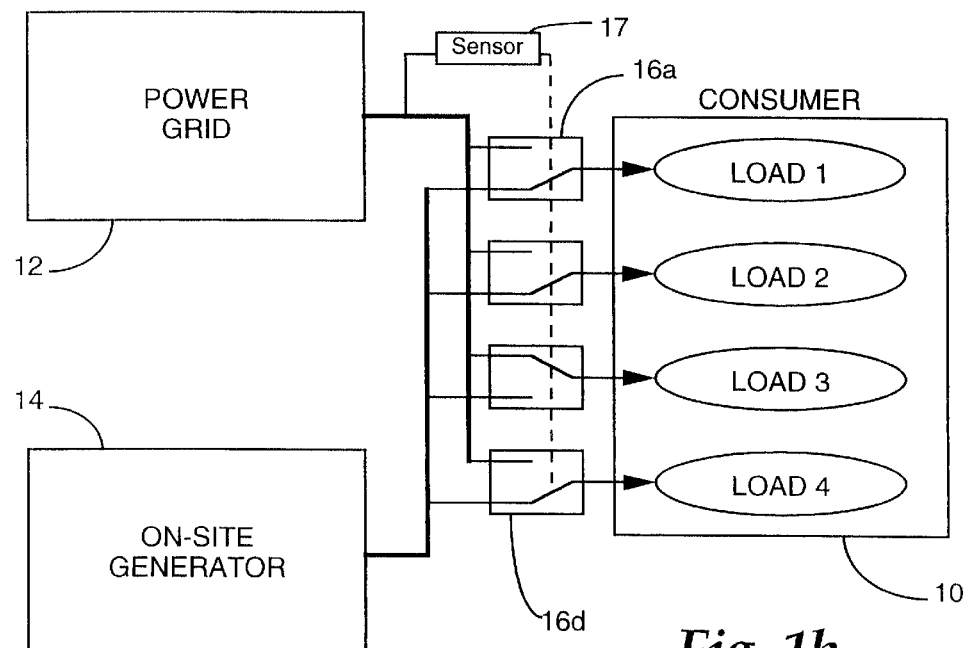
FIG. 1b is a general block diagram of a first embodiment of a power supply arrangement in accordance with the present invention when power via the grid is interrupted or diminished.

In the event that the supply of electricity via the power grid is interrupted or diminished, the on-site generator 14 can be employed to service one or more of the other loads which would be adversely affected by the interruption. For example, the consumer may specify that, if there is a power outage, the lights and computers must remain operable, whereas the ventilation is not as critical. To accommodate this situation, the individual loads can be selectively toggled between the power grid and the on-site generator by means of associated transfer switches 16a–16d. In the event of a power outage, therefore, the transfer switches for the lights and the computers can be switched to connect them to the power supplied by the generator 14, as depicted in FIG. 1b. To prevent an interruption in the power that is supplied to the load as the switch is made from the power grid to the on-site generator, and thereby provide virtual synchronization of the locally-generated power with the grid, the switches preferably include an ultra capacitor, or the like, which can store and provide high-wattage power for the brief period of time while the switching is taking place.

The decision to switch additional loads to the on-site generator 14 can be based solely upon the ability of the power grid 12 to provide reliable, high-quality power to these additional loads. For instance, in a fairly simple mode of operation, the lower priority loads can always remain connected to the power grid 12, except when there is a complete power outage. In this case, their respective transfer switches 16 are actuated to connect them to the on-site generator 14. The actuation of the switches 16a–16d can be carried out manually by someone at the consumer site, or automatically in response to sensors 17 that detect a loss of power from the grid 12, or a decrease in current and/or voltage below a preset threshold. In another implementation of this embodiment, the actuation of the switches 16 might be carried out by an off-site control facility which is informed of areas that have lost power via the grid, and toggles the switches to connect them to the on-site generators.

To accommodate the demand for increased on-site power supply that is represented in the situation of FIG. 1b, various implementations can be employed. In one approach, multiple generators can be installed at the consumer's site, to provide a capacity equal to or greater than the highest expected peak demand for equipment that has been designated as critical by the consumer. For example, the requirements of the refrigeration equipment might be adequately handled by two generators. To provide increased capacity during power outages, two additional generators can be installed, and remain normally idle when they are not needed. Additional generators can be located at the consumer's site for additional redundancy. When the switches 16a–16d are actuated to switch any of the loads from the power grid 12 to the on-site generator 14, such action can also cause the additional generators to be automatically turned on, and connected to the load. Preferably, when multiple generators are present, an on-site controller is employed to sense the level and quality of the power from the grid, and actuate the switches 16 and generators 14 accordingly. The controller also senses the demands of the various loads, and operates to distribute the loads among the generators. The controller can be a general purpose or special purpose computer, for example.

Alternatively, or in addition, the power that is supplied to the refrigeration load can be cycled on and off, to balance it among the requirements of the other loads. This approach is practical for loads such as refrigeration, which are capable of operating effectively while the power is being cycled, due to the operational "inertia" inherently associated with them. More particularly, once the perishable items have been cooled to an appropriate temperature, it becomes feasible to divert the power to other loads until such time as the temperature rises to a level that requires further cooling.

The on-site generation equipment 14 can be one or more of the various types of self-contained power supplies. One example of such a power supply is a fuel cell which is capable of meeting the on-site generation needs of a consumer. In one preferred embodiment of the invention, the on-site generation equipment comprises microturbine generators. To be effective in meeting the on-site generation needs of a consumer, particularly in situations where total loss of power from the grid occurs, the on-site generator should possess the following characteristics:

(1) Unlimited ability to follow changing loads;
(2) Ability to start and operate with full functionality whether in conjunction with or independent from an external power source, such as the power grid;
(3) Ability to provide unaffected service despite large, unpredictable inrush currents such as those associated with starting motors at a commercial or light industrial locations;
(4) Environmental emissions performance sufficient to allow full-time operation without violating environmental regulations.

An example of a microturbine generator which possesses these features is described in commonly assigned, co-pending application Ser. No. 09/034,259, the disclosure of which is incorporated herein by reference.

Figure 2:
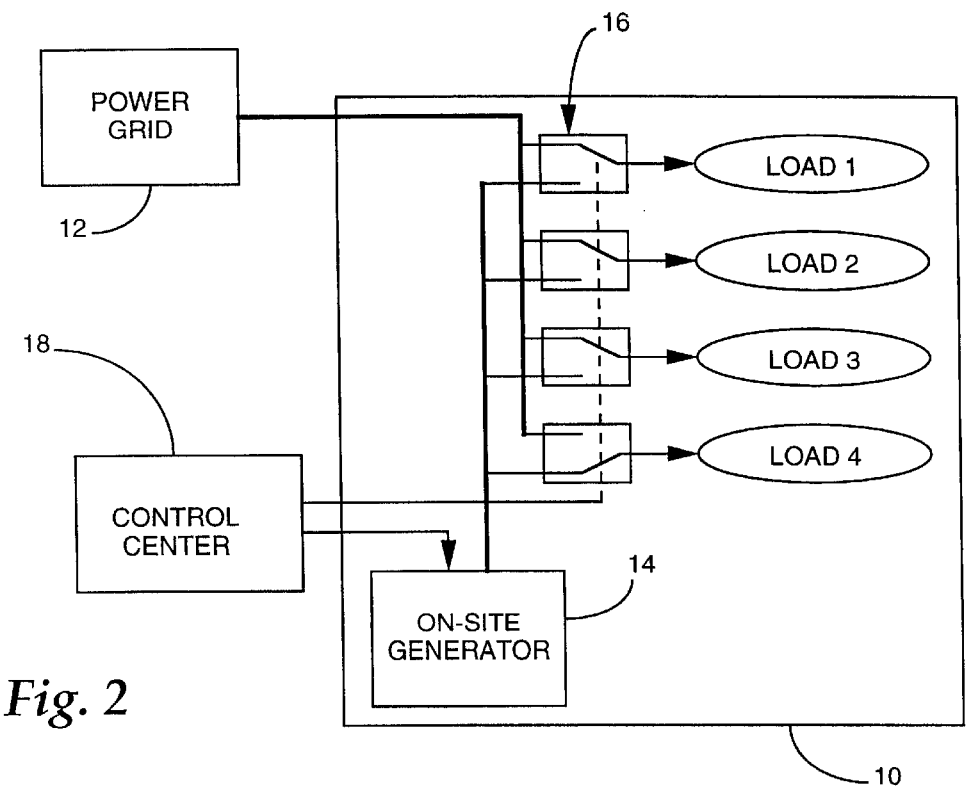
FIG. 2 is a general block diagram of a second embodiment of a power supply arrangement, having off-site control of on-site generation equipment.

Generally speaking, the embodiment of FIG. 1 can be considered to be a "reactive" arrangement for the management of energy supplies, in which the decision to switch between the power grid and the on-site generation equipment is carried out in reaction to the state of the power grid. In a further embodiment of the invention, additional factors beyond the state of the power grid can be employed in determining whether to connect loads to the power grid or the on-site generation equipment. A general overview of this embodiment is depicted in FIG. 2. In addition to being reactive to conditions at the site, the embodiment of FIG. 2 is "pro-active" in operation, in that the decision whether to employ on-site generation facilities is also based on a larger, and somewhat predictive, range of input parameters.

As in the embodiment of FIG. 1, the embodiment of FIG. 2 includes one or more loads at the consumer's site 10, which can be selectively connected between the power grid 12 and on-site generation equipment 14 by means of transfer switches 16. These switches are actuated in response to commands that are provided from a control facility 18, as well as in response to sensors 17 or an on-site controller, as described previously. The control facility also sends commands to the on-site generation equipment 14, to cause it to start up or shut down, as necessary. Preferably, the control facility 18 is located at a site remote from the consumer, from which it is able to manage the energy supply for a number of different consumers.

Figure 3:
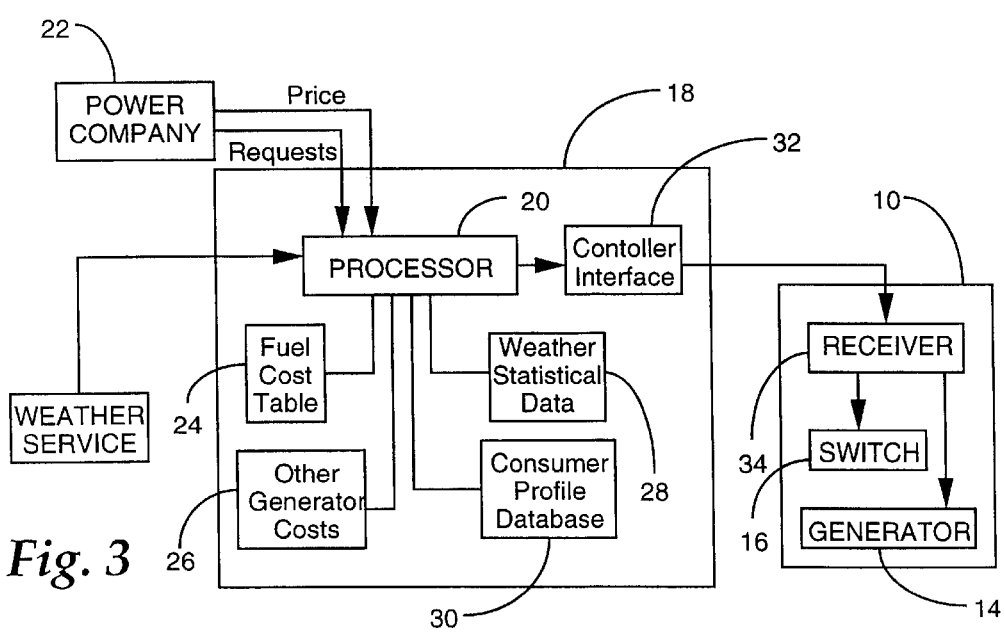
FIG. 3 is a more detailed block diagram of the central control facility.

The commands which are issued by the control facility 18 to actuate the switches 16 and activate the generator 14 are based upon various types of data from different sources. FIG. 3 illustrates the control facility 18 in greater detail. The facility includes a processor 20, which can be a general purpose or special purpose computer, for instance. This processor receives the data and generates commands to control the switches and on-site generators. Some of this data is received in real time from external sources, whereas other data is stored at the control facility, in one or more tables and/or databases.

One type of data that is employed by the processor 20 is the pricing of the power that is supplied by the power company 22, through the power grid 12. With the deregulation of the power companies, time-of-day pricing becomes more prevalent, and it is feasible to evaluate the costs of grid versus on-site power on a continuing basis. The example of FIG. 3 illustrates the situation in which the price data is provided in real time by the power company. As an alternative, the data may be published on a day-ahead or hour-ahead basis. In this case, it can be downloaded on a timely basis, e.g. from a site on the Internet, and stored locally at the central control facility. This data is compared against the costs that are associated with operating the on-site generation equipment 14. These costs can include the charges for fuel that is consumed by the equipment, such as the prices for natural gas or any other type of hydrocarbon fuel that might be employed to run the equipment. These prices might be stored in a table 24 that is updated on a regular basis from information provided by the suppliers of the fuel. Other costs that might be included in this process include those associated with the regular maintenance of the equipment, the costs for the installation and marketing of the equipment, which might be amortized over its life, finance charges, and the like. These costs could be stored in another table 26 within the control center 18. The processor 20 compares the aggregate of these generator-related costs against the rate structure for the power company. From this comparison, a determination is made whether it is more economical to employ power from the grid 12 or to use the on-site generation equipment 14.

In effect, therefore, the control center 18 functions to arbitrage between the grid power and the locally generated power. This capability is facilitated by having on-site power generation which is capable of being substituted for the power grid, such as that provided by the microturbine generators described previously.

The decision to switch between the two different power sources can be made on a relatively simple basis. Whenever the cost of power supplied over the power grid 12 is less than the aggregate costs of operating the on-site generator, the switches 16 can connect the loads to the power grid. When the cost of grid power exceeds that of on-site generation, the appropriate switches are activated to connect the loads to the local generators. To avoid frequent switching between the two sources, for instance when the respective costs are fluctuating in narrow ranges that are close to one another, it may be preferable to employ a form of hysteresis, or a minimum difference, before switching from one source to the other.

In addition to pricing types of considerations, other factors are preferably employed by the control center to determine when to switch between grid power and locally generated power. Current weather conditions, such as temperature and humidity, can be received on a real-time basis and evaluated against statistical data 28 stored in the central control facility to determine the likelihood that an outage will occur in the power grid. This evaluation can also include geographically related factors, such as the altitude of a particular consumer's site. In the event that there is a reasonable probability that a power outage might occur at a consumer's site, based upon the statistical data 28, the control center can switch the loads over to the on-site generation equipment as a pre-emptory move, rather than wait until an actual outage occurs. In addition to interruptions due to adverse weather conditions, the statistical data 28 can be used to predict when loads may change, prices may change, or the reliability of the grid may vary, and switch between the power sources accordingly.

Another factor in the switching decision can be historical usage data of the consumer. For each consumer, therefore, the control facility can store a profile in a database 30, which might include the usage data, geographical data, etc. The usage data might indicate patterns of peak demand that can be anticipated to determine when additional power may be needed. For instance, in the case of a restaurant, the usage data may show that, at 4:00 a.m. each day, the load increases significantly, as grills and ovens are first turned on. This information can be used to determine whether to start an additional generator at that time, to accommodate the increased demand.

The data profile can also include information regarding the operating parameters of the on-site generation equipment which provides the most efficient and/or economic operation. For example, if each generator operates most efficiently above a certain level of output power, it may be advisable to turn one or more generators off if they are all currently operating below that level.

Each of these various factors can be appropriately weighted relative to one another and combined in the processor 20 to produce a decision whether to maintain the connection to the current power source or switch to the alternative one. If a decision is made to switch to the alternative source, a command is sent to a controller interface 32 identifying the particular switches to be activated. If an on-site generator needs to be started, the command can also identify this fact. In response, the controller interface sends signals to the designated switches and generators to carry out the necessary actions. These signals can be transmitted through any suitable medium, such as via telephone, cable, dedicated lines, over the Internet using TCP/IP protocol, satellite and other wireless transmissions, etc.

At the consumer's site, the signals from the central control facility 18 are received at equipment 34 that is analogous to a "set-top box" used for cable and satellite communications. For instance, if the internet is used as the medium to transmit the control signals, each receiver 34 can have its own IP address for receiving packets of control information from the central site. Preferably, the receiver 34 is implemented within an on-site controller that functions to dispatch the power requirements among multiple generators, as described previously. Upon receipt, the receiver decodes each packet and sends a command to the appropriate switch 16 to connect its associated load to the power grid or on-site generator, as required. The receiver can also send commands to the individual on-site generators to start up or shut down, as necessary.

In a preferred implementation of the invention, the consumer-site receiver can also provide information upstream regarding the status of the switches 16 and the on-site generators. For instance, each generator which is currently operating can provide information to the on-site controller regarding its power output. The controller can provide this information to the central control facility 18, to thereby indicate the percentage of each generator's capacity that is being utilized. If the percentage reaches a threshold level, the control facility can issue a command to start another generator, to thereby provide sufficient extra capacity in the event that a power boost is needed, for example when a compressor motor starts up. Conversely, if multiple generators are operating at a low percentage, the control facility can send a command to shut down one or more of the generators, to thereby reduce on-site power generation costs. Alternatively, the distribution of the power requirements among multiple generators can be carried out locally by the on-site controller.

Figure 4:
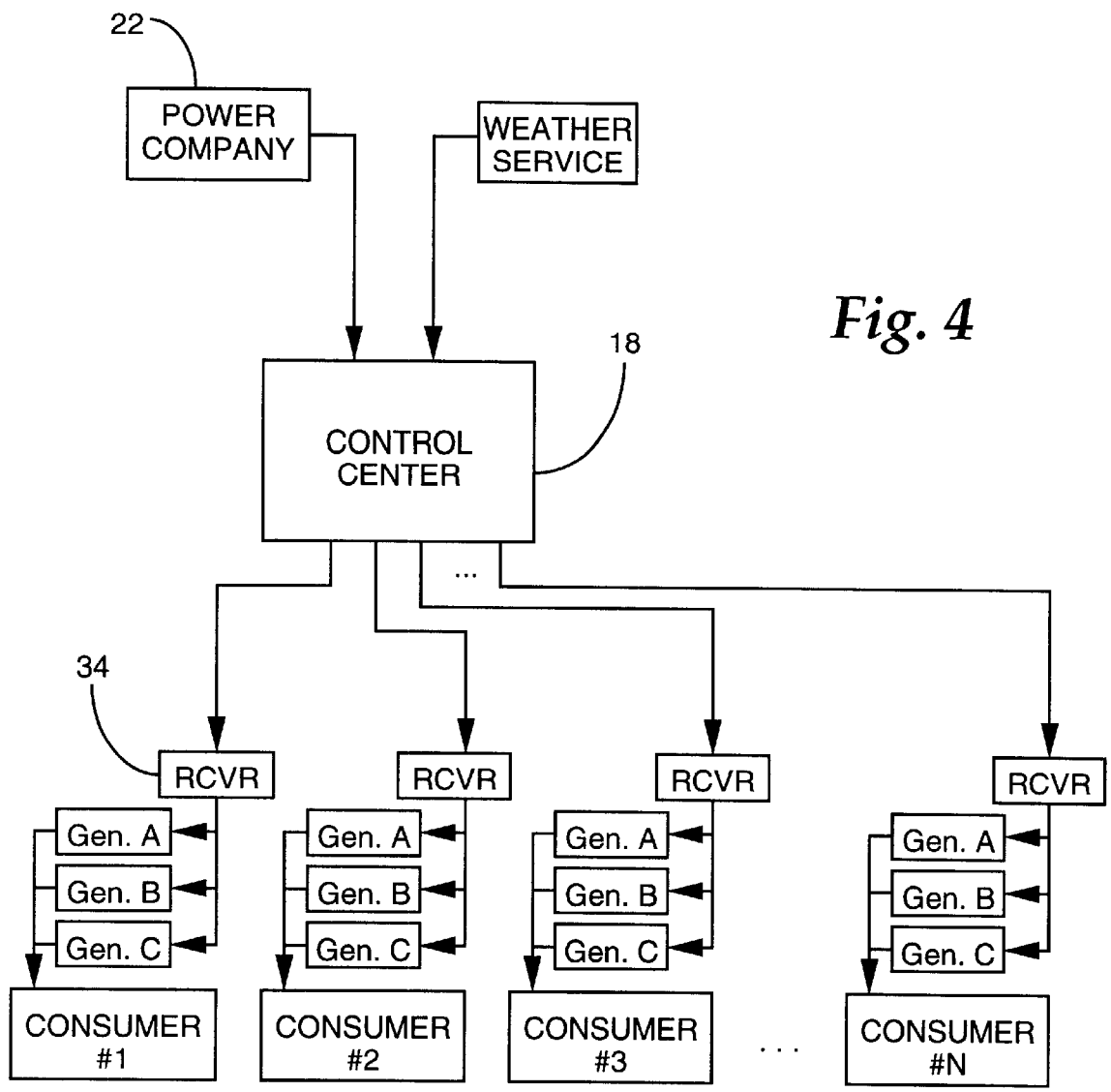
FIG. 4 is a block diagram of an application of the second embodiment to the management of energy supply for multiple consumers.

The upstream transmission of data to the central control facility also provides usage data that can be employed to update the consumer's profile in the database 30. In addition to providing information regarding the utilization of the individual on-site generators, it may be desirable to obtain information about the total power utilization at the consumer's site, whether that power is being supplied via the power grid or the on-site generators. This data can be obtained by sensing the current consumption at each load, for example, and uploading it to the central control facility on a regular basis, e.g. every five minutes, once an hour, etc. The example of FIG. 2 illustrates a single consumer's site connected to the control center. In a practical application of the invention, the control center can be employed to monitor and control the on-site generation equipment of multiple consumers in a geographic area, as depicted in FIG. 4. Such a grouping of consumer sites under the control of a central facility can form a local network of controlled sites, which might encompass a well-defined area such as a city block or neighborhood. Each of these local networks can, in turn, be subnetworks within a larger network of power-managed sites. Some of the in-put information, such as pricing data and weather data, can be used to collectively control the on-site generation equipment at all of the consumers sites within the network. Other input information, such as historical usage data and consumer demand information that is stored in the database 30, can be employed to selectively control each consumer's site individually or within the local network. While the example of FIG. 4 depicts each consumer's site as having three on-site generators, labeled A, B and C, it will be appreciated that the sites could have different numbers of generators which are suitable to handle the particular requirements of those sites, respectively. In another aspect of the invention, the on-site generation equipment can be used to complement the resources of the power company. For example, in periods of high demand, the power grid may not have the capacity to deliver a reliable level of power to all consumers. Rather than impose a brown-out condition under these circumstances, the power company 22 can present requests to the control center to keep the on-site generation equipment operating during these periods, and thereby reduce the load on the power grid. With this approach, the on-site generation equipment not only facilitates the on-going operation of the individual consumer to which it is connected, but also works to the advantage of all other consumers of the power company, by alleviating the possibility of an extended brown-out condition.

From the foregoing, it can be seen that the present invention provides an arrangement which enables on-site power generation to be successfully integrated with centralized power delivery, in a manner which provides the consumer with power at the most economical rate available, while meeting the consumer's service needs as to reliability, power quality and environmental responsibility. Furthermore, by switching between centrally delivered power and locally generated power in an intelligent manner based upon a variety of factors, the present invention operates in both a reactive and a pro-active manner to ensure a reliable source of power to the consumer at all times. As a result, it becomes possible to effectively arbitrage between the power grid and the on-site generation, so that power can be delivered to the consumer at a guaranteed constant price. It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A system for managing the supply of energy to a load that receives power from an electric power grid, comprising:
   at least one on-site power generator that is capable of supplying power to said load independently of said power grid;
   a controller which processes data relating to at least one factor that is predictive of the reliability and/or quality of power supplied to said load, and selects the power grid or the on-site generator as a preferred power source; and
   a switch which is responsive to the selection of the preferred power source to connect the load to the selected power source.

2. The system of claim 1 wherein said factor is the probability that the power grid can reliably supply power under prevailing weather conditions, and wherein said controller selects the on-site generator as the preferred power source when the probability is below a threshold level.

3. The system of claim 1 wherein said controller is further capable of selecting a preferred power source on the basis of a factor pertaining to the relative costs of power supplied via the power grid and the on-site generator.

4. The system of claim 3 wherein said relative costs include data regarding the price of fuel consumed by the on-site generator.

5. The system of claim 3 wherein said relative costs include data regarding the operating costs of the on-site generator.

6. The system of claim 5 wherein said data includes a profile of the efficient and economic operating parameters of the on-site generator.

7. The system of claim 3 wherein said relative costs include data regarding time-of-day pricing of power supplied via the power grid.

8. The system of claim 7 wherein said pricing is stored at said controller.

9. The system of claim 7 wherein said pricing is received at said controller in real time.

10. The system of claim 1 wherein said factor is data relating to historical power usage by the load.

11. The system of claim 10 wherein said controller selects the on-site generator as the preferred power source at times when said usage data indicates that the load will have increased power requirements.

12. The system of claim 1 wherein said controller is located at a site that is remote from the load, and transmits commands to said switch via a communications medium.

13. The system of claim 12, wherein said communications medium is the Internet.

14. The system of claim 12, wherein said communications medium is wireless.

15. The system of claim 14, wherein said communications medium includes satellite transmissions.

16. The system of claim 12, wherein said communications medium comprises a cable network.

17. The system of claim 1 wherein said controller controls said on-site generator to start and stop in dependence upon the preferred power source that is selected.

18. The system of claim 17 wherein multiple on-site generators are connectable to said load, and said controller selectively controls said generators to start and stop individually in dependence upon power requirements of the load.

19. A system for managing the supply of energy to a plurality of loads at different sites that each receive power from an electric power grid, comprising:
   a plurality of on-site power generators respectively located at said different sites that are each capable of supplying power to an associated load independently of said power grid;
   a controller located remote from said sites which processes data relating to at least one factor affecting the supply of power to the loads, and selects the power grid or an on-site generator at each respective site as a preferred power source;
   a communication interface which transmits the selections made by the controller to the respective sites; and
   a switch at each site which is responsive to the transmitted selection of the preferred power source for that site to connect the load at that site to the selected power source.

20. The system of claim 19 wherein said factor is the probability that the power grid can reliably supply power under prevailing weather conditions at the respective sites, and wherein said controller selects the on-site generator at a given site as the preferred power source when the probability is below a threshold level for that site.

21. The system of claim 19 wherein said factor is the relative costs of power supplied via the power grid and the on-site generators.

22. The system of claim 21 wherein said relative costs include data regarding the price of fuel consumed by the on-site generators.

23. The system of claim 21 wherein said relative costs include data regarding the operating costs of the on-site generators.

24. The system of claim 21 wherein said relative costs include data regarding time-of-day pricing of power supplied via the power grid.

25. The system of claim 24 wherein said pricing is stored at said controller.

26. The system of claim 24 wherein said pricing is received at said controller in real time.

27. The system of claim 19 wherein said factor is data relating to historical power usage by the respective loads.

28. The system of claim 27 wherein said controller selects the on-site generator at a given site as the preferred power source at times when said usage data indicates that the load at that site has increased power requirements.

29. The system of claim 19, wherein said communications interface transmits said selections to the sites via the Internet.

30. The system of claim 19 wherein said controller selectively controls each of said on-site generators to start and stop in dependence upon the preferred power source that is selected.

31. The system of claim 30 wherein multiple on-site generators are connectable to a load at a site, and said controller selectively controls said generators at that site to start and stop individually in dependence upon power requirements of the load at the site.

32. A method for ensuring an uninterrupted supply of quality power to a load that receives power from an electric power grid, comprising the steps of:
   providing a power generator at the site of the load, which is capable of supplying power to the load independently of the power grid;
   processing a plurality of factors which affect the supply of power to the load, wherein at least one of the factors is predictive of the reliability and/or quality of power from the electric power grid; and
   selectively connecting the load to the electric power grid or the generator in response to the processing of said plurality of factors.

33. The method of claim 32, wherein said one factor is the probability that the power grid can reliably supply power under prevailing weather conditions, and the generator is selectively connected to the load when the probability is below a threshold level.

34. The method of claim 32 wherein another of said factors is the relative costs of power supplied via the power grid and the generator.

35. The method of claim 34 wherein said relative costs include data regarding the price of fuel consumed by the generator.

36. The method of claim 34 wherein said relative costs include data regarding the operating costs of the generator.

37. The method of claim 36 wherein said data includes a profile of the efficient and economic operating parameters of the generator.

38. The method of claim 34 wherein said relative costs include data regarding time-of-day pricing of power supplied via the power grid.

39. The method of claim 32 wherein said one factor is data relating to historical power usage by the load.

40. The method of claim 39 wherein the generator is connected to the load at times when said usage data indicates that the load has increased power requirements.

41. The method of claim 32 wherein the processing of said factors is performed at a site that is remote from the load, and the selective connection is carried out by commands transmitted via a communications medium from said remote site to the load.

42. The method of claim 41, wherein said communications medium is the Internet.

43. The method of claim 41, wherein said communications medium is wireless.

44. The method of claim 43, wherein said communications medium includes satellite transmissions.

45. The method of claim 41, wherein said communications medium comprises a cable network.

46. A system for managing the supply of energy to a load that receives power from an electric power grid, comprising:
   at least one on-site power generator that is capable of supplying power to said load independently of said power grid; and
   a controller which processes at least one factor relating to the reliability and/or quality of the supply of power to said load, and selectively connects said load to receive power from said on-site generator in response to said factor.

47. A system for managing the supply of energy to a plurality of loads at different sites that each receive power from an electric power grid, comprising:
   a plurality of on-site power generators respectively located at said different sites that are each capable of supplying power to an associated load independently of said power grid;
   a controller located remote from said sites which processes data relating to at least one factor affecting the supply of power to the loads, and determining whether an on-site generator at each respective site should be connected to an associated load;
   a communication interface which transmits the determinations made by the controller to the respective sites; and
   a switch at each site which is responsive to the transmitted determination to selectively connect the load at that site to receive power from the on-site generator.

48. A method for ensuring a supply of quality power to a load that receives power from an electric power grid, comprising the steps of:
   providing a power generator at the site of the load, which is capable of supplying power to the load independently of the power grid;
   processing a plurality of factors which affect the supply of power to the load, wherein at least one of said factors relates to the reliability and/or quality of the power; and
   selectively connecting the load to receive power from the generator in response to the processing of said plurality of factors.

* * * * *